United States Patent [19]
Branch

[11] Patent Number: 5,419,439
[45] Date of Patent: May 30, 1995

[54] APPARATUS AND METHOD FOR AUTOMATIC MULTIPLE LEVEL SORTATION OF LAUNDRY

[76] Inventor: Thomas R. Branch, 6 Sterling Ct., Cartersville, Ga. 30120

[21] Appl. No.: 94,013
[22] PCT Filed: Dec. 27, 1991
[86] PCT No.: PCT/US91/09802
   § 371 Date: Oct. 21, 1992
   § 102(e) Date: Oct. 21, 1992

Related U.S. Application Data

[63] Continuation-in-part of Ser. No. 634,614, Dec. 27, 1990, Pat. No. 5,125,513.

[51] Int. Cl.⁶ .................................................. B07C 5/02
[52] U.S. Cl. ..................................... 209/3.3; 209/583; 209/615; 209/706; 209/937; 209/942; 209/566
[58] Field of Search ............... 209/3.3, 552, 583, 606, 209/615, 706, 925, 937, 942, 565, 566; 198/360, 370, 465.4; 414/13

[56] References Cited

U.S. PATENT DOCUMENTS

| | | | |
|---|---|---|---|
| 3,151,730 | 10/1964 | Bunten | 198/38 |
| 3,454,148 | 7/1969 | Harrison | 198/28 |
| 4,239,435 | 12/1980 | Weiss et al. | 414/136 |
| 4,303,503 | 12/1981 | de Mimerand et al. | 209/3.3 |
| 4,473,373 | 9/1984 | Weiss | 8/137 |
| 4,693,460 | 9/1987 | Adamson et al. | 271/10 |
| 4,907,699 | 3/1990 | Butcher et al. | 209/3.3 |
| 5,005,691 | 4/1991 | Jennewein et al. | 198/465.4 |
| 5,058,750 | 10/1991 | Graese | 209/583 |

*Primary Examiner*—D. Glenn Dayoan
*Attorney, Agent, or Firm*—Bernstein & Associates

[57] ABSTRACT

Apparatus and method for performing multiple level sortation operations upon a number of randomly ordered garments. The garments are identified by unique identification data, which can be scanned and entered into a computer. The computer remembers the order in which garment identification data has been. The garments are then transferred in their entered order to a first sortation assembly in which a rotating wheel assembly accepts and selectively releases garments during indexed rotation of the wheel at one of a number of stop points. Each stop point has associated with it a receiving rail, where each rail represents a different group within a first sortation level. The computer recognizes which receiving rail is the correct rail for each garment according to the first sortation criteria and signals the release of the garment at the correct stop point. The garments collected on each receiving rail comprise a group of first sorted garments according to the first sortation criteria. The groups are transferred in a desired order to a second sortation assembly, which performs the same sortation operation as the first sortation assembly according to the second sortation criteria. The groups of second sorted garments are transferred to a third sortation assembly, which has a rotating wheel assembly. The third sortation assembly also has associated with it a number of sets of collecting arms, where individual arms from each set of arms represents a sortation group and can accept a garment from the wheel assembly at a predetermined stop point in accordance with the third sortation criteria. The arms transfer garments to a collecting rail, which are then removed.

20 Claims, 11 Drawing Sheets

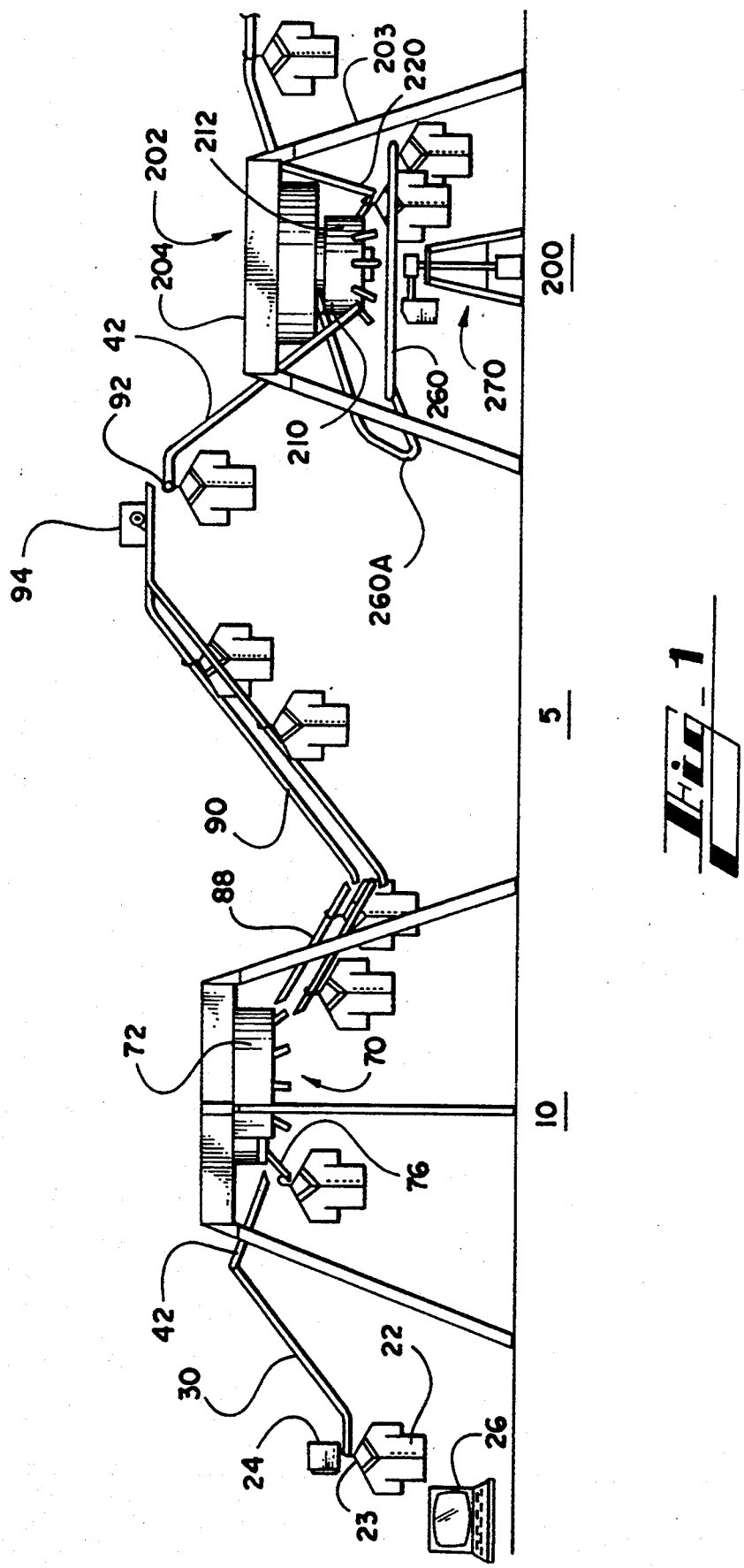

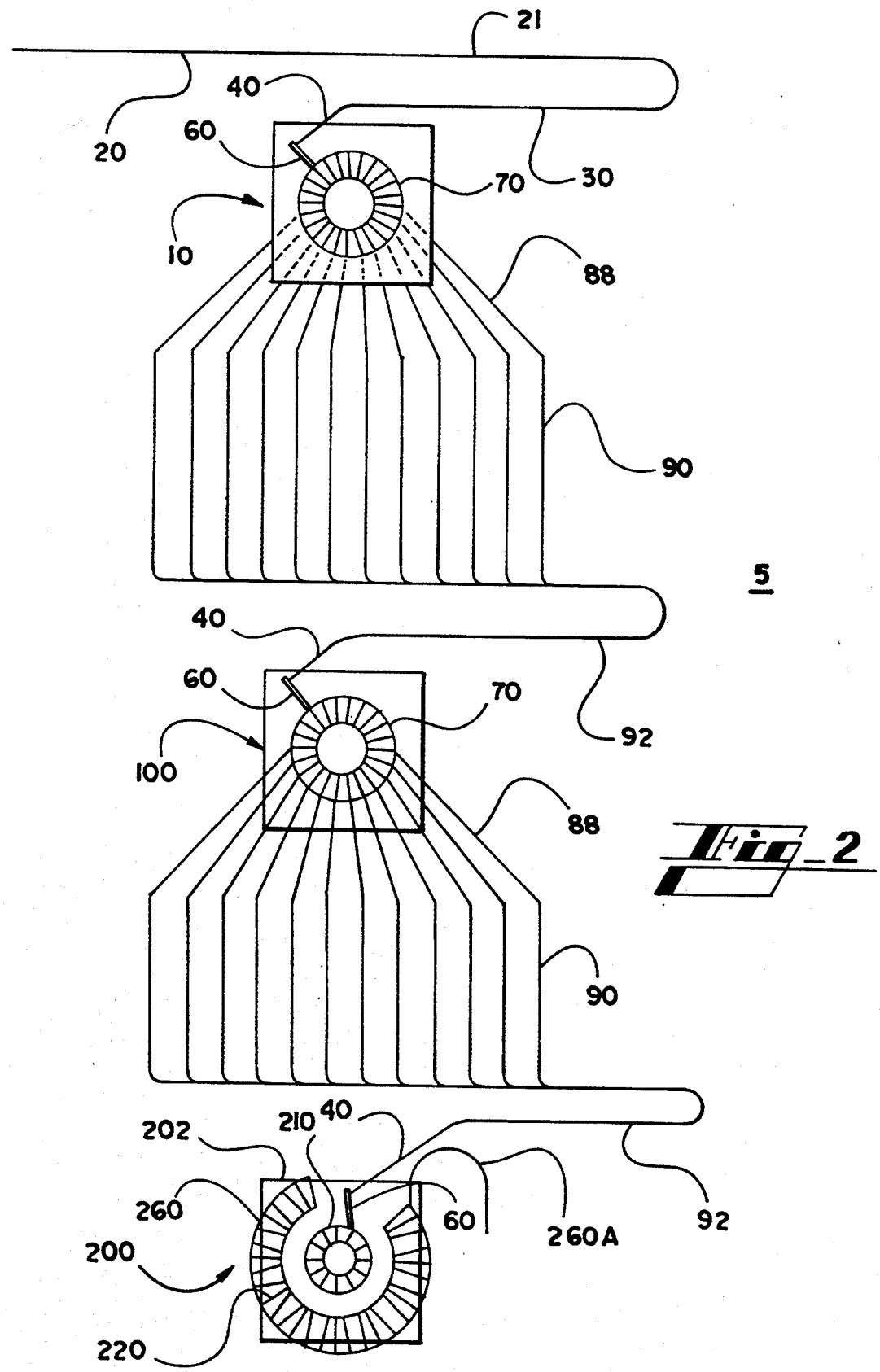
Fig_2

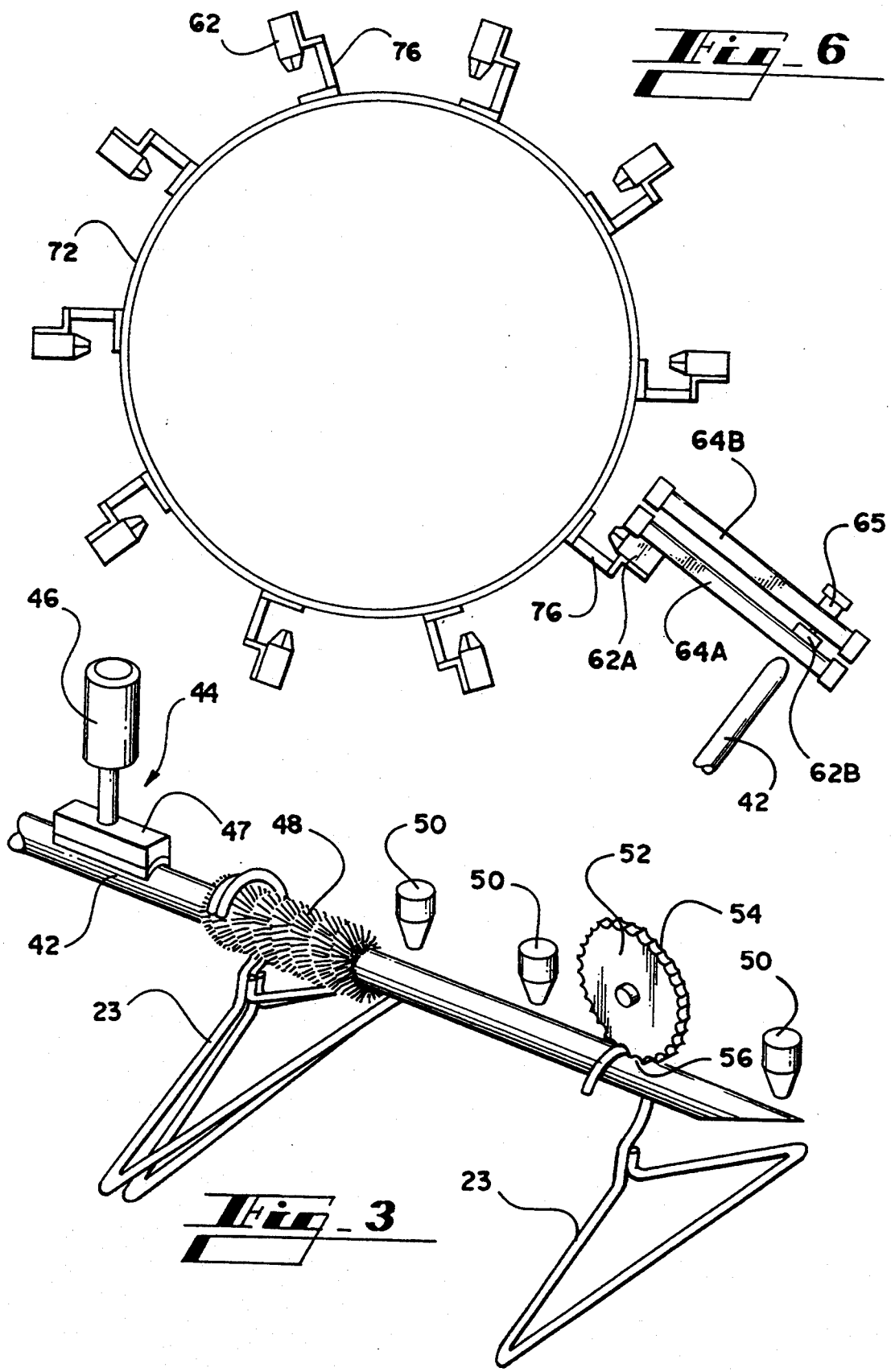

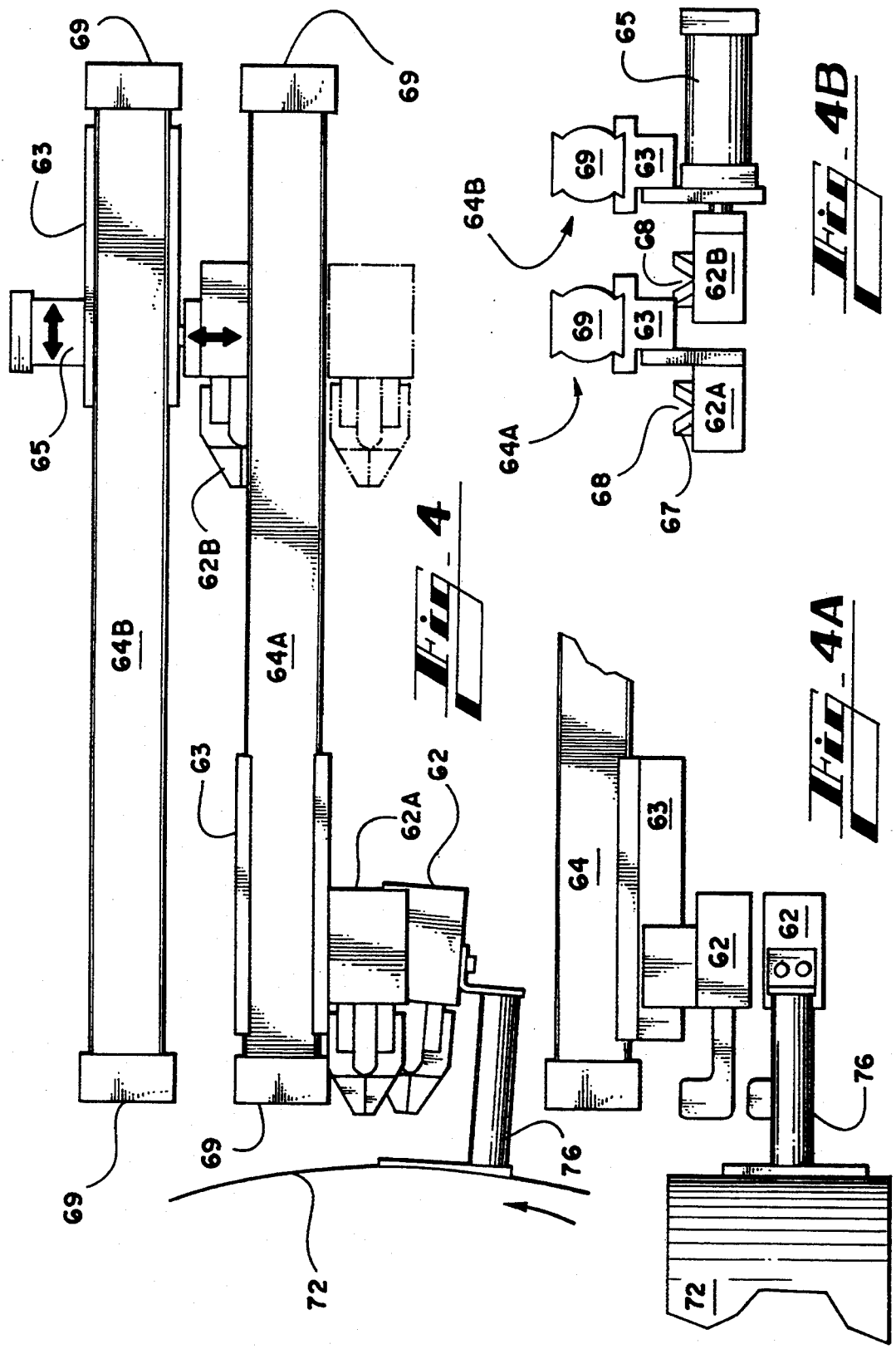

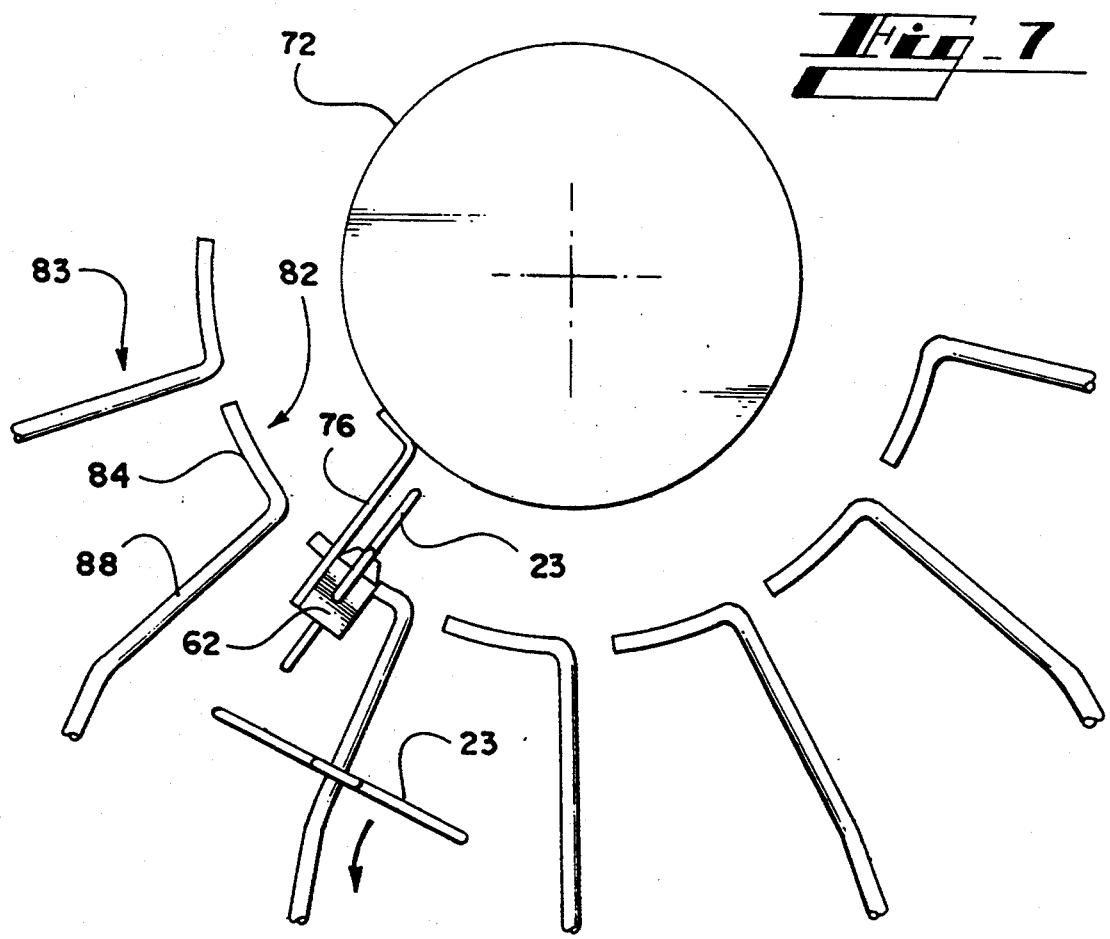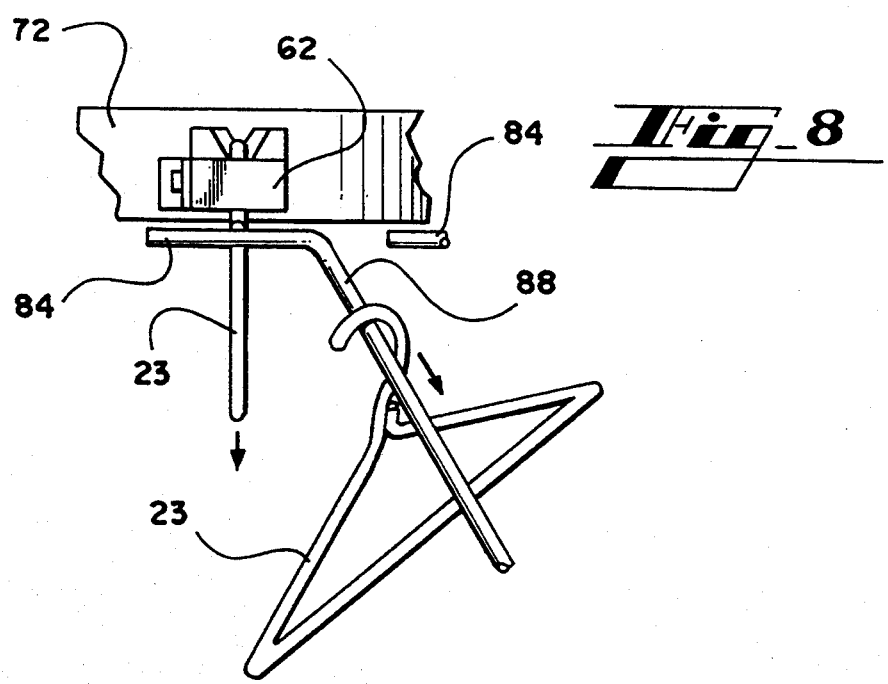

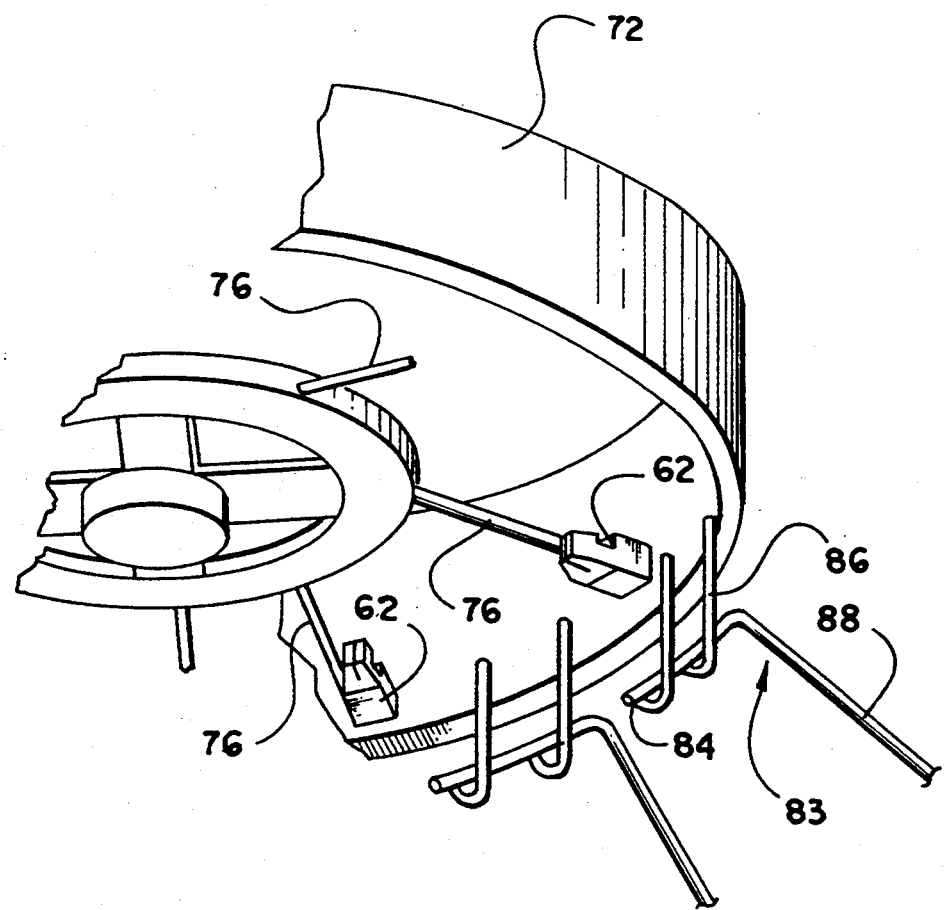
Fig_9

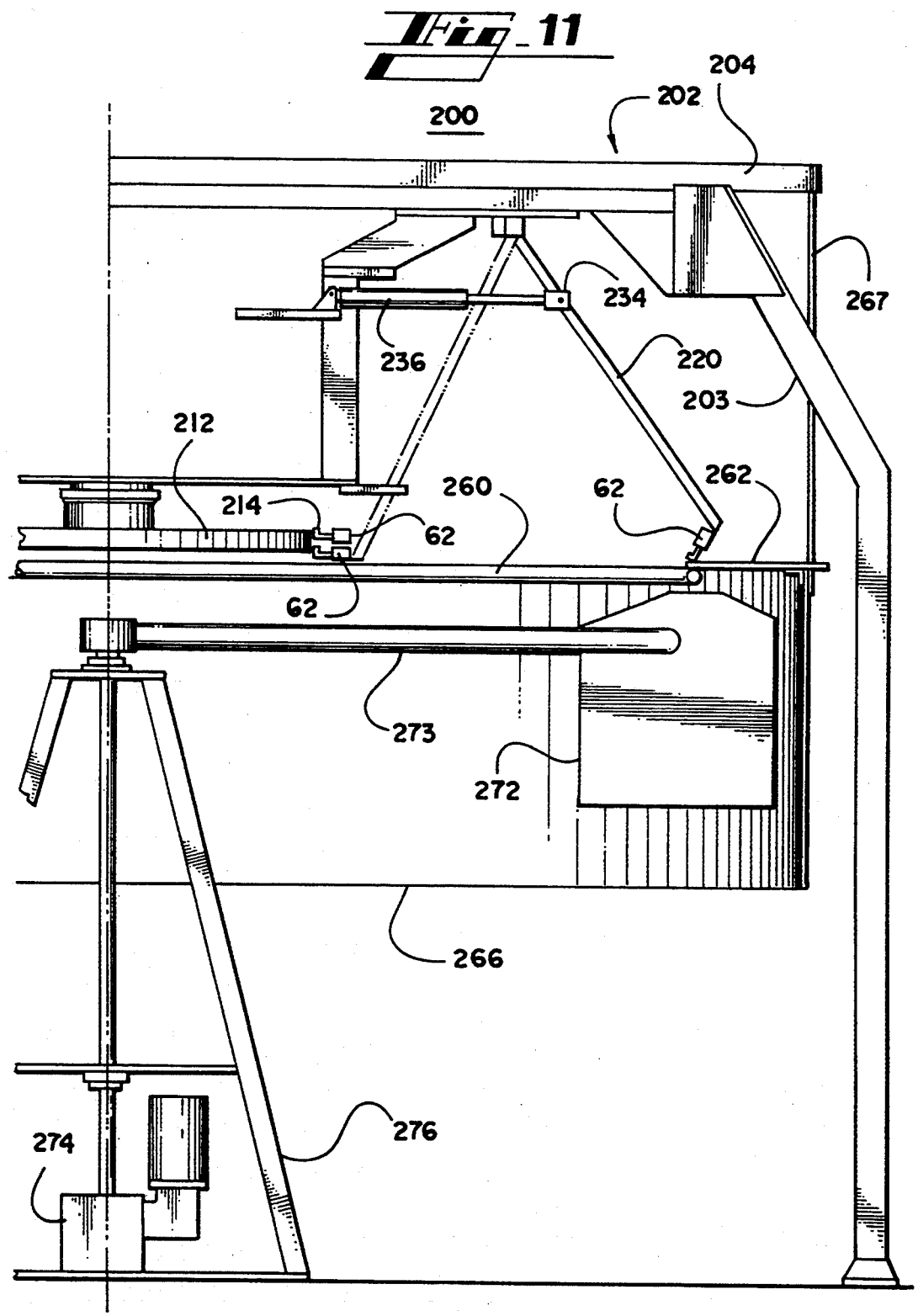

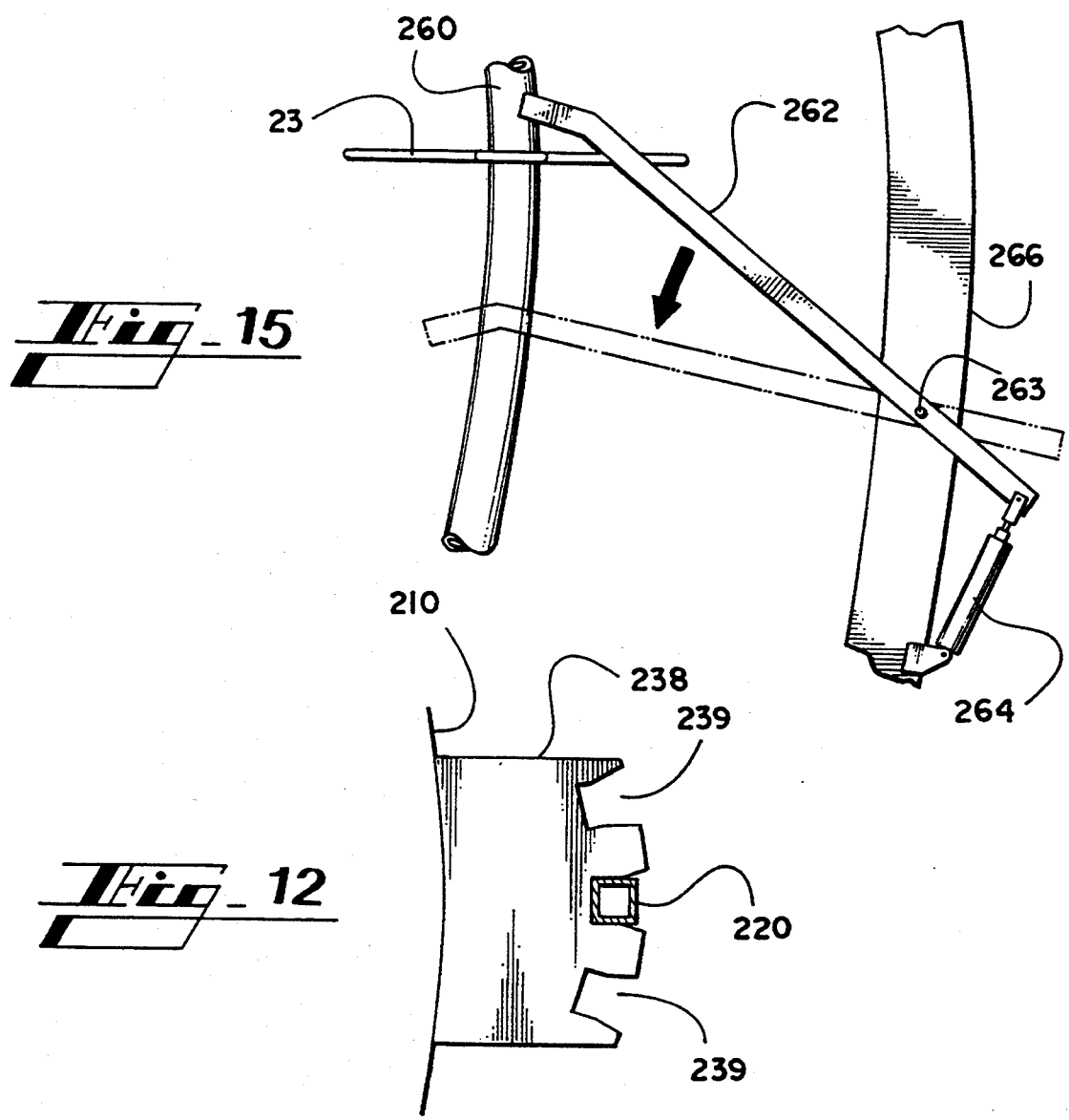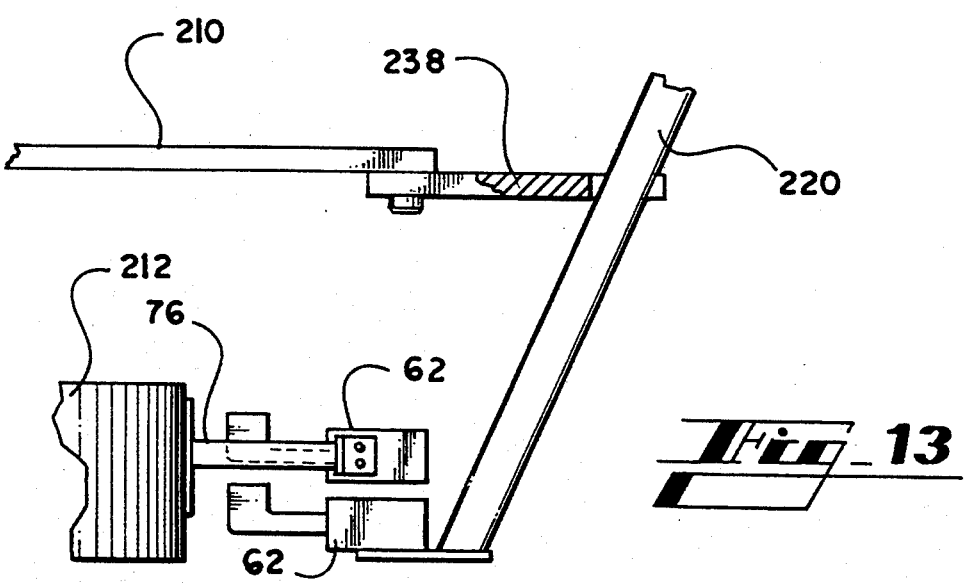

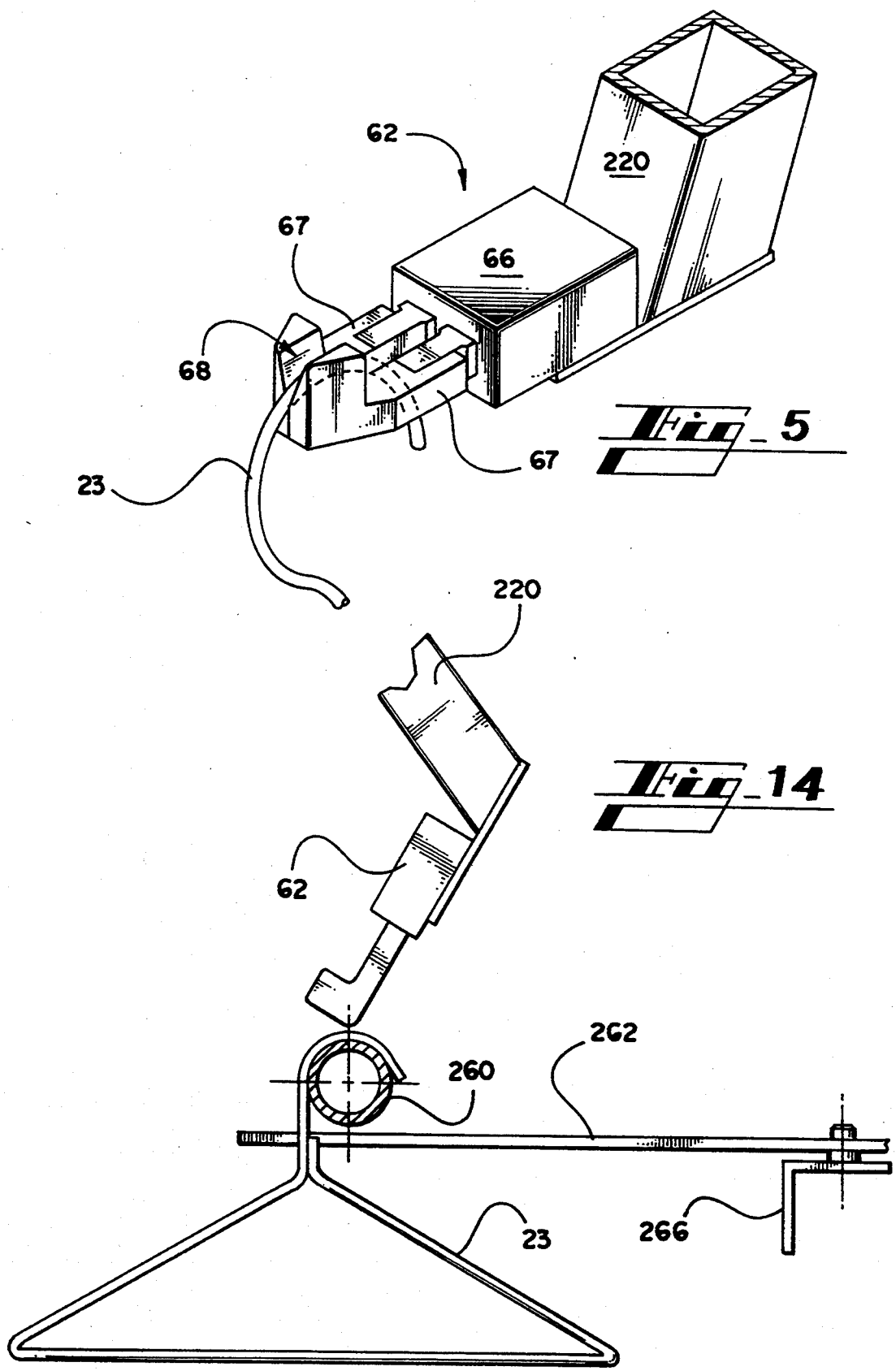

APPARATUS AND METHOD FOR AUTOMATIC MULTIPLE LEVEL SORTATION OF LAUNDRY

FIELD OF THE INVENTION

This is a continuation-in-part of application Ser. No. 07/634,614, filed Dec. 27, 1990, and now U.S. Pat. No. 5,125,513.

The present invention relates to laundry sorting equipment, and more particularly relates to an apparatus and method for automatically assembling garments based on associated unique identification data.

BACKGROUND OF THE INVENTION

As used herein the terms "cleaning" and "laundry" and their derivatives and counterparts refer to both dry cleaning (without water) and wet cleaning, and these terms may be used interchangeably to refer to both the act or process of washing and pressing and the things washed and the place where it is done. It is also contemplated that the method and apparatus of the present invention can be used to sort other items, such as uniforms, fabric samples, carpeting pieces, machined parts, tires, or the like. Furthermore, the present invention can be used in any industry where numerous items to be sorted can be identified by unique information and can be moved by the mechanisms of the invention. For the purpose of the present invention the items to be sorted are laundered garments hung on conventional wire hangers.

A commercial cleaner receives items to be cleaned from a number of different accounts. One account may be a large manufacturing facility with hundreds of workers, each having his or her own uniform or garment. A commercial cleaner normally cannot efficiently clean laundry or other items by handling items on a single account basis. The cleaning process is more efficient when the full capacity of machines is used requiring several accounts' items to be grouped together for cleaning. Thus, items from several accounts may be mixed and cleaned as a load to efficiently utilize cleaning equipment. Commercial laundry cleaning operations are successful because they process a large number of garments together in large machines.

Where the account is a facility that has a large number of garments being used by its workers, the garments must be arranged for delivery in some rational order so that workers are not spending inordinate time and effort locating their shirts or uniforms. Since the soiled garments are being returned to the same cleaners routinely for laundering, a means for identifying the garments can be attached permanently or removably to the garment. If affixed permanently, the cleaning operation does not have to attach new identification tags to the soiled garment every time it is received for cleaning. One means for identifying garments is by using conventional bar code strips affixed to the garments and read by a bar code reader. This identification system also eliminates the need for the individual account to sort soiled garments before being sent for cleaning.

In the uniform rental industry there normally is no invoice nor ticket to match. The identification information is permanently affixed to the garment, and the batches of laundry are kept together.

In the commercial cleaning of residential customers' garments, such as business shirts, a time consuming element of the sorting process is the step of separating the lot of cleaned items and assembling them with the appropriate ticket, remembering that a single ticket may contain several items of cleaning. Conventionally, a worker picks the first item in the lot off the rack, looks at the identifying data thereon, places the item with the appropriate ticket, and proceeds to the next item in the lot. This represents three opportunities for worker error. Because the cleaned items cannot be maintained in any particular order in the machines during cleaning, they must be sorted by hand by visually checking and pairing numbers after cleaning. Accordingly, it will be appreciated that it would be highly desirable to unite each item in a lot with their appropriate tickets without manually handling each item at each step of the reassembly process.

A problem associated with the sorting process that occurs after garments are laundered is that a worker must physically handle the tag to read the identification data which may consists of a four, five or even six or more digit number or combination of numbers and letters, creating an opportunity for error in reading the data. Even when being extremely careful, a worker is prone either to misread the identifying data or to transpose digits and thereby place a garment with the wrong ticket. The result of such an error is that an account receives the wrong item or no item at all.

Recently, several apparatus have been developed which automate, to a degree, the sortation process. U.S. Pat. No. 4,239,435, issued Dec. 16, 1980, to Weiss et al., discloses an apparatus and method for arranging a plurality of randomly arranged identifiable articles into a predetermined order. The apparatus includes a conveyor for releasably supporting the randomly arranged articles and for conveying the articles supported thereon past at least one receiving station arranged about the conveyor for receiving the articles. Identifying means are associated with the receiving station for identifying each article as it is conveyed past the receiving station. Release means responsive to the identifying means are provided for releasing the article identified by the identifying means from the conveyor means to the receiving station when the article identified is the next succeeding article in the predetermined order with respect to the articles previously received by the receiving station. Articles are only removed from the conveyor means when they are the next succeeding article in a predetermined order. The remaining articles will remain on the conveyor for subsequent passes past the receiving station. The method for arranging randomly arranged articles into a predetermined order comprises releasably supporting the randomly arranged articles on support means and moving the articles past at least one receiving station for receiving the articles. As each of the articles move past the receiving station, each article is released from the support means to the receiving station when the article is the next succeeding article in the predetermined order with respect to the articles previously received by the receiving station. The articles remaining on the support means continue moving past the receiving station until all of the articles on the support means are released to the receiving station.

Weiss et al. teaches that the garments are manually loaded onto a slow moving conveyor; only after all the garments are loaded can the apparatus speed up. Furthermore, the latch release mechanism which holds the wire hanger on the conveyor is very complex and mechanically inefficient. The apparatus requires a reference support position so that each of the receiving stations can initialize itself every rotation of the conveyor. Numerous rotations must be employed before all garments are removed by the receiving stations. In other words, because the garments are sorted linearly and in a single sortation conveyor system, a garment must travel around and around until the receiving station assigned to that garment is ready to receive it. This is likened to a card game of solitaire, where the player must deal cards from the deck repeatedly until the next playable card can be used. The deck must be replayed with all remaining cards until the appropriate numerical play can be made. It would be desirable for an automated apparatus to sort garments whereby the garment would be removed from the sorting machine to a receiving assembly within a single rotation. This would efficiently make room for more garments sooner.

Additionally, Weiss et al. must unload every garment from the conveyor onto the receiving stations before reloading a new batch. It would be desirable for an apparatus to automatically and continually accept and sort garments until the last garment to be sorted is loaded. Fewer operators would be required to supervise the operation.

U.S. Pat. No. 4,907,699, issued Mar. 13, 1990, to Butcher et al., discloses a method and apparatus for sorting and arranging garments in a selected order which have been sequentially placed in an unordered sequence. The garments are identified by a marking affixed to each garment, and each garment arranged in its identified sequence on a sorting conveyor having a multiplicity of movable carriers each for receiving a garment. Identification signals are rearranged in a preselected order, and a plurality of arranged signals are assigned to each one of a corresponding plurality of pick-off mechanisms positioned along the sorting conveyor. A computer calculates bidirectional movement of the sorting conveyor to minimize conveyor movement for positioning a garment for pick-off in its proper sequence by a respective one of the pick-off mechanisms. The conveyor is driven in a bidirectional mode to properly position the garment, and a pick-off mechanism is activated to remove the garment from the sorting conveyor and position the garment on an unloading conveyor. Each conveyor pick-off apparatus includes a fluid-powered cylinder inclined downward toward the sorting conveyor, and a drive unit for closing the carrier mechanism.

Butcher et al. requires the use of a reference marker to initialize the receiving assemblies for each rotation of the conveyor past the receiving stations. This system also uses a carousel that loads garments onto the conveyor. The carousel acts blindly, transferring every garment to the next position on the conveyor, regardless of order, and is not actively involved in the selective release of garments in a sortation operation. The carousel takes the place of a person in performing a simple transfer function, with little or no computer controlled selection commands.

Butcher et al. also uses a carrier mechanism on the carousel to transfer the garments to a very narrow numbered slot on a conveyor system that may hold hundreds of garments. The bidirectional conveyor motor must jockey back and forth to properly align the slot with the hanger, creating greatly increased wear on the motor. Extreme accuracy is needed by the conveyor stepping motor to index stop precisely at the carrier mechanism release point, otherwise the wire hanger will miss the appropriate slot. If a hanger should miss the numbered slot, its position will remain empty until all remaining shirts are loaded onto the conveyor and unloaded onto the receiving stations.

Understandably, it will be appreciated that it would be highly desirable to have a laundry sorting apparatus that is compact and does not require an enormous amount of floor space.

SUMMARY OF THE INVENTION

Accordingly, it is a principal object of the present invention to provide an apparatus for the multiple level sortation of garments.

It is another object of the present invention to provide an apparatus which can sort garments based upon unique identification data associated with each garment.

It is a further object of the present invention to provide an apparatus which can sort a randomly ordered sequence of hanging garments. Information associated with each garment is entered in order into a computer. The garments are conveyed and loaded onto a first sortation assembly where each garment is selectively transferred by means of a wheel assembly to one of a plurality of receiving assemblies according to an initial set of identification data. The thus assembled groups are transferred in group order to a second sortation assembly, similar to the first sortation assembly, where the same operation occurs according to the second sortation level criteria. The twice sorted garments are then conveyed to a third sortation assembly. At this third sortation assembly the garments are loaded sequentially onto a third wheel assembly, which rotates and positions the garment for a collecting arm to swing in and accept the garment from the wheel. The arm transfers the garment to a rail, which supports the garments in the third sortation level order. Sorted garments are removed from the rail and loaded onto trucks for delivery.

It is yet another object of the present invention to provide a method and apparatus for the sortation of large numbers of garments requiting few people to operate and supervise the operation.

The present invention overcomes the deficiencies in the prior art and provides for an apparatus and method for the multiple level sortation of a number of randomly ordered items. In a preferred embodiment, the invention comprises a computer means for receiving, processing and transmitting control signals. A scanning means is provided for inputting into the computer identification data associated with a randomly ordered stack of garments, each of the garments having unique identification data. Each garment is hung on a conventional wire clothes hanger. A first sortation assembly comprises a first rotating wheel assembly being capable of receiving at least one garment and subsequently selectively releasing the garment upon receipt of a signal from the computer at one of a plurality of predetermined points around an arc during the wheel assembly rotation. A transfer assembly is associated with the first wheel assembly for transferring garments to the wheel assembly after the identification data has been inputted into the computer means. A receiving assembly is provided for accepting garments from the wheel assembly according to the identification data associated with the garment. Each receiving assembly is associated with the same level of sortation criteria. Each receiving assembly corresponds to a different group within the same sortation level. The resulting assemblage of garments now defines a set of groups of first sorted garments.

The present invention further provides a second sortation assembly which receives ordered groups of first sorted garments from the first sortation assembly. The second sortation assembly comprises a second rotating wheel assembly and transfer assembly. A plurality of receiving arms disposed in an arc around the second wheel assembly selectively accept garments from the second pickup assembly and transfer the garments to a rail in accordance with signals sent by the computer. These garments now define a set of groups of second sorted garments. The garments can be removed from the rail and loaded onto trucks for delivery to the wearers.

In a preferred embodiment of the present invention a third sortation assembly similar to the first sortation assembly is positioned in the sortation process between the first and second sortation assemblies. A transfer assembly delivers garments from the first assembly to the next, and another transfer assembly delivers garments from that one to the last assembly. This additional sortation assembly is likewise in communication with the computer.

The three wheel assemblies use carrier mechanisms to releasably support and transfer the wire hangers. These carriers are responsive to a signal from the computer.

A method is provided for the multiple level sortation of a number of randomly ordered items comprising inputting identification data associated with a randomly ordered stack of garments to a computer. After the information is entered the garment is transferred to the first sortation assembly one garment at a time. The sortation assembly transports the garment and selectively releases the garment at a predetermined position. The garment is accepted by one of several receiving assemblies according to the identification data for that garment maintained in the computer. All garments having the same grouping within the given sortation level will be accepted by one receiving assembly, defining a group of first sorted garments. The groups of garments are transferred with each group maintaining its contiguity onto a collection conveyor. The groups are conveyed in a selected account order to a second sortation assembly, similar to the first sortation assembly. The second sortation assembly performs a similar second sonation operation according to the next desired level of sortation. Twice sorted garments are conveyed to a third sortation assembly. The third sortation wheel assembly can accept a number of garments, each preferably on an individual carrier mechanism attached to the wheel assembly. The wheel assembly rotates and can stop at pre-determined points. At each point one of a group of three arms can selectively swing in and accept the garment in response to a signal from the computer. The arm then swings out and releases the garment onto a collecting rail assembly. Each arm represents a group within the third sortation level. The garments transferred to the rail have now been sorted three times, according to identification data stored in the computer. The sorted garments are removed from the rail in the sorted order and transferred to a holding rail for loading onto trucks for delivery or for storage.

In a typical laundry processing facility, garments are sorted first by truck route, then by account within the route, and then by individual garment within the account. Additional sorts are possible by adding additional sortation assemblies similar to the first sortation assembly.

Stated more particularly, a method is provided for performing multiple sortation operations upon a number of garments, each garment having associated with it a unique identification means, comprising: scanning the identification means to create electronically transmittable data; entering the data into a computer means; transferring the garments to a first wheel assembly, the wheel assembly having a plurality of spaced carrier means associated therewith, each carrier means capable of releasably supporting a garment hanger, the first wheel assembly being able to rotate such that each of the carrier means stops at a predetermined stop point; selectively releasing each the garment at a predetermined stop point during rotation of the first wheel assembly in response to a signal from the computer means onto one of a plurality of receiving means, each receiving means corresponding to a distinct group within a first sortation level, the groups of garments defining a first sortation assemblage; transferring the first sortation assemblage to a second sortation assembly; loading the first sorted garments onto a second wheel assembly the second wheel assembly having a plurality of spaced carrier means associated therewith, each carrier means capable of releasably supporting a garment hanger, and a plurality of collector arms associated with the second wheel assembly and an associated drive means for automatically bringing the each of the collector arms independently toward and away from the second wheel assembly for receiving a garment, each arm having associated with it an arm carrier means, and each arm representing a different sortation group within a second sortation level for selectively accepting the garments from the second wheel assembly according to the identification data associated with the garment so that each the garment is sorted according to its corresponding identification data; rotating the second wheel assembly such that each of the carrier means stops at a predetermined stop point; moving at least one the collector arm carrier means toward the wheel carrier means at the stop point; transferring the garment from the wheel carrier means to the collector arm carrier means in response to a signal from the computer indicating that the collector arm is the correct arm for the garment; and, releasing the garment onto a collecting means whereby garments transferred by a given the collector arm are collected together in a sorted group, and whereby the groups define a second sortation assemblage.

BRIEF DESCRIPTION OF THE DRAWINGS

FIG. 1 shows a side elevational view of an apparatus having two sortation assemblies.

FIG. 2 shows a top schematic view of an apparatus having three sonation assemblies.

FIG. 3 shows a perspective view of the feeder mechanism.

FIG. 4 shows a top view of the transfer mechanism.

FIG. 4A shows a side view of the transfer assembly with transfer carrier A positioned over wheel carrier B.

FIG. 4B shows an end view of the transfer assembly.

FIG. 5 shows a detailed perspective of the hanger carrier mechanism.

FIG. 6 shows a top view of the first sortation wheel and transfer assemblies.

FIG. 7 shows a top view of the wheel assembly and receiving assemblies.

FIG. 8 shows a side view of the receiving fingers with respect to the wheel assembly.

FIG. 9 shows a perspective view from underneath the wheel and receiving assemblies.

FIG. 11 shows a detail side view of the third sortation assembly.

FIG. 12 shows a top view of the stop blocks.

FIG. 13 shows a side view of the arm with respect to the wheel assembly.

FIG. 14 shows a side view of the sweeper finger, collecting rail and collecting arm in the "out" position.

FIG. 15 shows a top view of the sweeper finger assembly.

DESCRIPTION OF THE PREFERRED EMBODIMENTS

Figure 10:
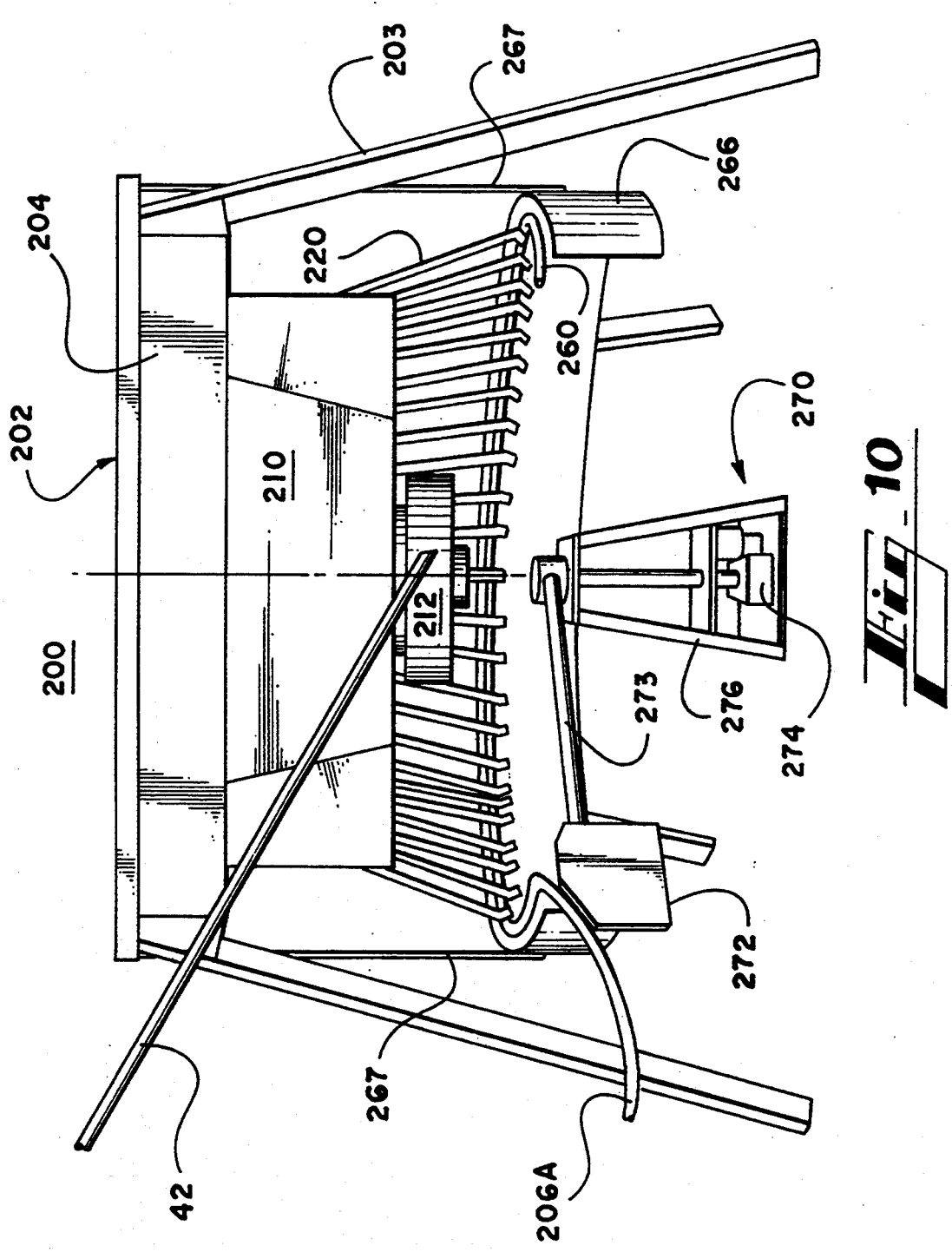
FIG. 10 shows a side perspective view of the third sortation assembly.

Referring to the drawings in which like numbers represent like elements, FIGS. 1 and 2 show a side elevational and a top schematic view of apparatus 5, generally comprising a first sortation assembly 10, a second sortation assembly 100 and a third sortation assembly 200. The second sortation assembly 100 represents substantially the same assembly as first sortation assembly 10. It is to be understood that apparatus 5 or individual sortation assemblies can be supported by legs attached to frames, or can be hung from a ceiling by suspended supports.

It is understood that the sortation process of the present invention can be accomplished by using only the first and third, or second and third sortation assemblies. The addition of the second sortation assembly permits an additional level of sortation, as will be described in greater detail hereinbelow. Alternatively, a forth sortation assembly or more assemblies similar to first sortation assembly 10 can be added to perform additional sorts.

The items to be sorted are typically garments, such as shirts, slacks, jackets, jumpsuits, uniforms, or the like, but can be any items that can be suspended in a similar manner, such as fabric pans, machine parts, and the like. For the purposes of the present description, garments 22 will be described that are hung individually on conventional wire hangers 23. Referring to the garment will normally include the hanger from which it is hung. Similarly, referring to the hanger will normally include the garment which hangs on it. It will also be assumed that a number of garments 22 from different accounts are commingled in a random order. Each garment 22 has a unique identification means associated with the garment. Such means can be a UPC bar code numbering tag, or other alpha, numeric, or symbolic identification means. The identification means is attached either removably or fixedly to the garment 22 or the hanger 23. Preferably, the means of identification is a bar code tag affixed to the garment, such as inside the collar. This presents an easily accessible and readable location.

At a data entry area 20 garments 22 are positioned on a feeder rail 21 in an unordered sequence for entry into the apparatus. Feeder rail 21, as well as the other rails used in the present invention are conventional slick rails, with polished surfaces lowering friction with hangers 23. Alternatively the rails can be conventional helix screw conveyors or any other industry-standard conveyor. Each of the garments 22 is scanned automatically or manually by the operator using a signal inputting means, which can be a bar code reader 24 or other means for transforming the identification signal into an electronic signal. The bar code reader 24 sends a signal to computer 26, which stores and processes the information, as will be described in greater detail hereinbelow.

Feeder rail 21 transfers garments 22 onto a conveyor 30, which is a conventional conveyor belt 32, made of chain, link, rubber, or the like, driven by a motor. The belt 32 preferably has a number of spaced pins 34, which can be fingers or other pick up means to more positively engage a hanger 23 and advance it along the conveyor path. Such pick up means can prevent slipping of the hangers 23 if the conveyor 30 is positioned at an inclined or declined angle. It should be noted that conveyor 30 may also be horizontal. The angle, if any, is a function of the height of feeder rail 21 with respect to first sortation assembly 10.

A feeder mechanism 40 is positioned along conveyor 30 to individually advance and present garments 22 to the first sortation assembly 10. As shown in FIG. 3 feeder mechanism 40 comprises a plurality of elements aligned along the axis of a rail 42. A portion controller 44 comprises a pneumatic cylinder 46 which, when activated, extends or withdraws a small gate 47 that can contact the rail 42 or grasp several hangers 23 between the gate and the rail. The gate 47 thus can block or permit the passage of hangers 23 from conveyor 30. Controller 44 ensures proper flow control of small groups of hangers 23 along rail 42 during the sortation process and prevents overloading of the system. A detangling apparatus 48 is positioned down line (meaning further along rail 42) from controller 44. Detangler 48 comprises an elongated cylinder 49 having a plurality of spaced bristles fixedly attached and extending axially outward along the external surface of the cylinder. The detangler 48 is driven by an external motor (not shown) connected to cylinder 49, and cylinder 49 is connected to rail 42 by bearings at either end of the cylinder.

Down line from detangler 48 is a pair of spaced apart sensing devices 50 which monitor passage of hangers 23. Sensing device 50 can be an electric eye, proximity switch, or the like. Sensing device 50 communicates with computer 26 the flow of hangers 23 by sensing when a hanger 23 has passed between the two sensing device 50. A sprocket drive 52 having a plurality of teeth 54 is mounted with its axis transverse to rail 42 and preferably positioned in a slight indentation 56 in rail 42, which generally corresponds to curvature of sprocket drive 52. The sprocket 52 and indentation 56 provide a flow control mechanism to permit passage of one hanger at a time. The variable speed sprocket motor controls the rate of passage of individual hangers 23. An additional sensing device 50 positioned along rail 42 down line from the indentation 56 indicates that the transfer mechanism is about to receive a hanger 23.

FIG. 4 shows a top view of a transfer mechanism 60, a dual loading system generally comprising two transfer careers 62 each mounted on a slide 63 facing toward first sortation assembly 10, a pair of parallel rodless cylinders 64A and 64B, and a transverse rod 65. The purpose of transfer mechanism 60 is to transfer hangers 23 from the feeder rail 42 loading point to first sortation assembly 10 loading/dropoff point. Carrier 62a is mounted to slide 63, which slidingly engages the underside of cylinder 64A. The carrier 62a can travel the length of cylinder 64A back and forth and is pneumatically driven. At the end of each cylinder 64A and 64B is a pair of end caps 69, which prevent slide 63 from coming of the end of the cylinder. Carrier 64B is mounted to a slide 63, which is attached to transverse rod 65. The slide 63 slidingly engages cylinder 64B. FIG. 4B shows an end view of transfer mechanism 60 with carriers 62A and B midway between the two loading points. Rod 65 can travel the length of cylinder 64B back and forth and is also pneumatically driven. Carrier 62B moves back and forth and can also move in an out along rod 65 in a direction transverse to cylinder 64B. Carrier 62B thus moves in two planes. The movement of both careers is such that when carrier 62A is at one end of cylinder 64A receiving a hanger 23, carrier 62B is at the opposite end of cylinder 64B releasing another hanger 23 onto first sortation assembly 10. The movement of the two carriers is such that they both start and end at the same points in space at opposite ends of the transfer mechanism, yet do not collide during their traversal. This is accomplished by carrier 62B being able to move in and out of the plane of travel, thus avoiding collision with carrier 62A. The dual loading capacity doubles the rate of hanger transfer and improves the overall efficiency of the sortation process. The transfer mechanism 60 is used at several transfer points in apparatus 5.

A detailed view of carrier 62 is shown in FIG. 5. The carrier 62 comprises a conventional pneumatic mechanism 66 which, in response to a signal, opens or closes a pair of mated pincers 67. The distal portions of pincers 67 form a V-shaped notch 68 when closed together. The carrier 62 holds hanger 23 within the notch 68, yet preferably does not grasp hanger 23 by exerting pressure from pincers 67. When carrier 62 is in the open position, hanger 23 is released and drops through the opening created between pincers 67. In this manner carrier 62 can accept, hold, transfer, and release hanger 23 more rapidly and accurately than by gripping hanger 23. Since carrier to carrier transfer is used, support of a hanger 23 in notch 68 effects a cleaner and simpler transfer than having each carrier grip the hanger, which would require a more complex transfer. Several carriers 62 are used in apparatus 5 and are substantially the same as described above.

Standardization of readily available parts, such as carrier 62 and pneumatic cylinders, and the like, and easy replacement or repair is advantageous in the present invention where several dozen carrier mechanisms may be used. Defective or failed pans can be replaced quickly without significant down time. Commercially available carrier mechanisms reduce construction costs.

Transfer mechanism 60 is positioned in proximity to feeder rail 42 such that the end of rail 42 is directly over transfer mechanism 60 when either carrier 62A or B is in the out position (away from first sortation assembly 10). For example, carrier 62 accepts one hanger 23 at a time from rail 42 in notch 68 as sprocket 52 releases individual hangers 23. The hanger 23 is transferred along the path of cylinder 64A or B and positions it to be released at the opposite end of the rod. As this occurs carrier 62B is moving back out on cylinder 64B. Either carrier 62A or B accepts hangers 23 at the same point and releases hangers 23 at the same opposite point.

First sortation assembly 10, shown in top view by FIG. 6 and in bottom perspective view by FIG. 9, generally comprises a wheel assembly 70, receiving assembly 80 and a plurality of receiving rail portions 88. Wheel assembly 70 comprises a central generally circular wheel 72 mounted with the axis in a vertical orientation, and is powered by a motor 74 (not shown) attached to the hub of the wheel. The motor 74 is preferably a servo motor which permits the wheel to rotate about its axis and index or stop at predetermined points. Wheel 72 rotates in a counterclockwise direction as viewed from above.

Spaced evenly around the outside circumference of wheel 70 is attached a number of fingers 76, to each of which is mounted a carrier 62, projecting in a radially outward direction. Wheel carrier 62 receives hanger 23 from transfer mechanism 60 during operation, such that each carrier 62 can receive one hanger 23. The motor 74 indexes so that wheel carrier 62 stops at a point directly under transfer carrier 62. During operation, hanger 23 is transferred from transfer mechanism 60 to wheel assembly 70 by opening transfer carrier pincers 67, causing hanger 23 to drop into the notch 68 on closed wheel carrier 62. Wheel carrier 62 is positioned just below transfer carrier 62 so that the drop is minimal and no significant bouncing occurs.

Hangers 23 are selectively transferred in accordance with the computer program to a receiving assembly 80, shown in FIGS. 7, 8 and 9, which generally comprises a segmented ring 82 positioned around and outside of wheel assembly 70. Ring 82 comprises a plurality of segments 83, each of which is an elongated receiving finger portion 84 positioned around the circumference of ring 82 and a slide rail portion 88 connected to finger portion 83 and angled outward and downward from ring 82. Each segment 83 is held in a fixed position relative to wheel 70 by a plurality of J hooks 86. Receiving fingers 84 are disposed below the arc of wheel carrier 62 such that when carrier 62 releases hanger 23, it drops onto receiving fingers 84.

Hanger 23 slides down by gravity to the bottom of slide rail 88. The rails 88 fan outward from each other to permit unobstructed passage of hangers 23. Hanger 23 drops onto one of a plurality of accumulation conveyors 90, one end of each is located just below the end of slide rail 88. A plurality of conveyors 90 are positioned generally parallel to each other separated by enough room so that hangers 23 on one conveyor 90 do not touch those on an adjacent conveyor 90, as shown in FIGS. 1 and 2. Hangers 23 are accumulated on conveyors 90 after they have undergone a first sortation operation by first sortation assembly 10.

Each conveyor 90 transfers its batch of sorted garments onto a common transfer conveyor 92, the group order of sorted garments can be specified by computer 26. Conveyor 90 is driven by motor 94. The garments 22 can be transferred in the first sorted order to a second sortation assembly 100, comprising the same assemblies and mechanisms of first sortation assembly 10. Conveyor 90 transfers garments 22 onto a feeder rail 42 and the process described above for first sortation assembly 10 can be repeated using a different sortation criteria. The resulting sorted garments 22 are again accumulated on a second set of accumulation conveyors 90 and have now been sorted twice, according to the computer 26 algorithm.

Garments 22 are transferred by second transfer conveyor 92 to a third feeder mechanism 40, which transfers the garments to third sortation assembly 200. Third sortation assembly 200 differs from first and second sortation assemblies 10 and 100 in several aspects. Third sortation assembly 200 is generally comprised of a frame 202, a transfer assembly 60, as described above, a wheel assembly 210, an arm assembly 230, a semi-circular collecting rail 260 and a paddle arm 270.

FIG. 10 shows frame 202, which comprises a set of downwardly extending legs 203 attached to a support 204, which maintains third sortation assembly 200 in an elevated position. Alternatively, support 204 may be suspended from a ceiling support lattice, eliminating the need for legs 203.Wheel assembly 210 comprises a generally circular wheel 212 attached to a servo motor 213 (not shown) which is fixedly attached to support 204. Wheel 212 can rotate about its vertically oriented axis in a smooth or indexed manner. Around the circumference of wheel 212 are a plurality of spaced fingers 214 protruding axially. The fingers 214 each have a carrier 62 mounted at their end. The carriers 62 rotate with wheel 212 as the wheel rotates. Stop points are spaced evenly around the wheel, so that during rotation wheel carriers 62 stop at predetermined points and can release or accept hangers 23.

FIG. 11 shows a detail of an arm assembly 215 comprising a plurality of arms 220 connected at its top end to support 204 by a pin 234. Arm 220 is a rigid straight rod or similar structure that can support a weight. A pneumatic drive cylinder 236 is connected to arm 220 below the top end of the arm, which pulls and pushes the arm in and out in response to a signal. At the bottom end of arm 220 is an arm carrier 62 pointed toward wheel 212. The arm carrier 62 in the "in" position is positioned to line up with wheel carrier 62 such that the arm carrier is just below the wheel carrier. In this way a hanger 23 supported by wheel carrier 62 can drop onto arm carrier 62 and can be transferred off the wheel 212. Arm 220 in the "out" position is angled away from the vertical and stops at a predetermined point over a circular collection rail 260, which can receive and support hangers 23 when carrier 62 opens, as shown in FIG. 15.

Figure 11A:
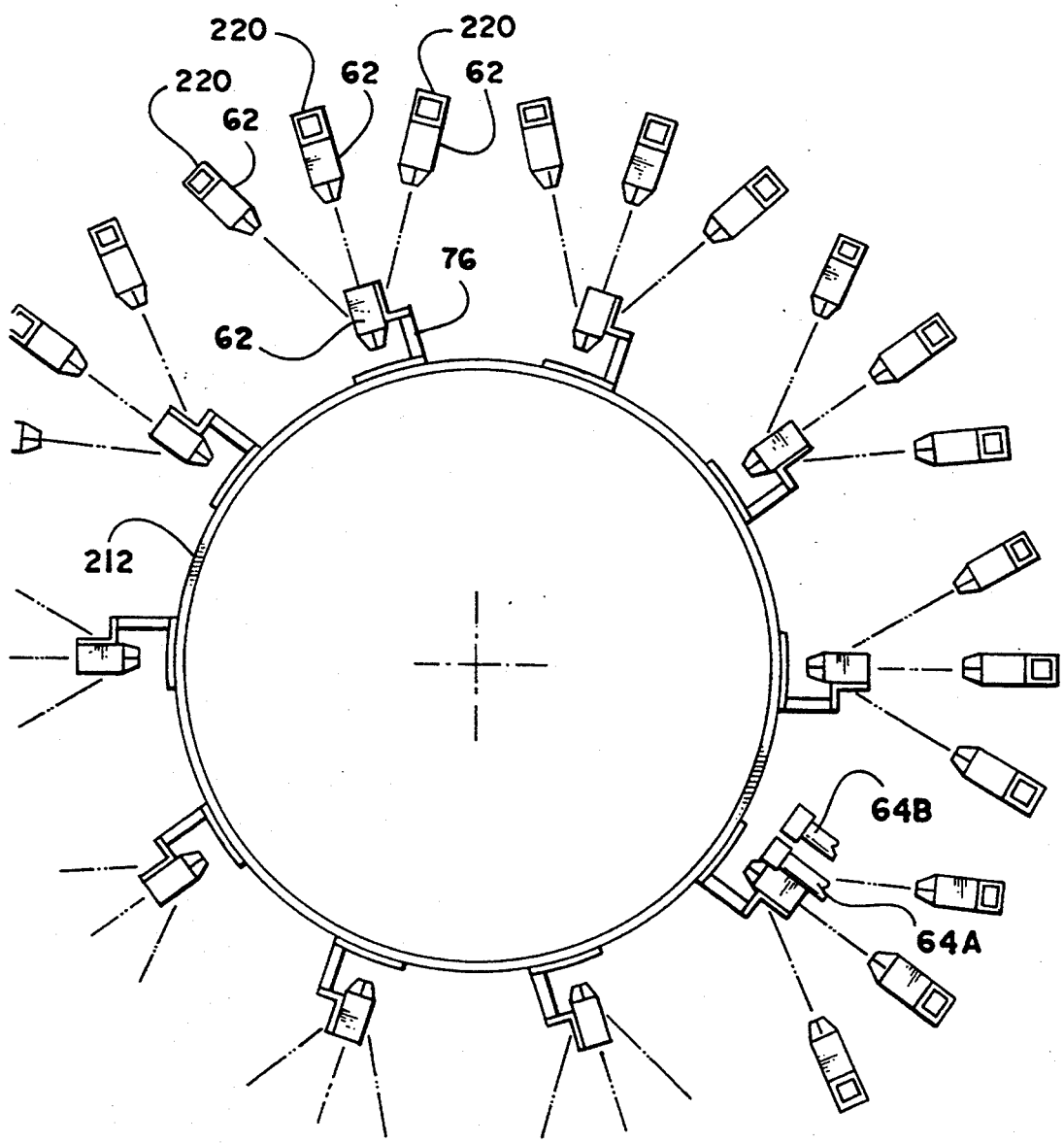
FIG. 11A shows a top view of the third sortation assembly showing the relative positions of the arm and wheel carrier mechanisms.

The number of arms 220 is related to the number of fingers 214/wheel carriers 62 stop points around the wheel. A multiple of the number of fingers 214 is used. Preferably a multiple of three is used, so that there are three arms 220 per finger 214. As shown in FIGS. 2 and 10 there is a portion of the third sortation assembly 200 where feeder mechanism 40 and transfer assembly 60 is located and there are no arms 220 to obstruct this loading area. Thus, a partial circle of arms is formed with none in the loading area. In a preferred embodiment arms 220 are grouped so that three adjacent arms 220 are angled inward so that when in the "in" position, each of the three arms meets at one wheel carrier 62 stop point, as shown in FIG. 11A. Each set of three arms 220 thus "services" one wheel carrier 62 stop point.

FIG. 11 shows a detail of an arm 220 in the "in" position and its relative location with respect to wheel 212. Also shown is a notched stop block 238 which stop further inward movement of arm 220 when being pulled by pneumatic cylinder 236. The block 238 is preferably made of nylon or other durable material, and is preferably not metal, which would wear less efficiently. In the preferred embodiment there are three notches 239 in stop block 238 per wheel stop point, corresponding to each of three arms 220. FIG. 12 shows a top view of stop block 238.

FIG. 11 shows collecting rail 260, which is positioned just below arms 220 in the "out" position. Each arm 220 can selectively receive a hanger 23 from wheel carrier 62 (as shown in FIG. 13) in response to a signal form computer 26 and swing out and over rail 260. In response to a signal arm carrier 62 releases hanger 23, which drops onto rail 260.

Since each arm 220 drops a hanger 23 onto collecting rail 260 in the same spot each time, the hangers must be moved to one side to permit the next hanger to be dropped onto rail 260 without colliding with the previous hanger. A sweeper finger 262 pushes newly received hanger 23 off to one side, thereby enabling the next hanger 23 to drop onto rail 260 unobstructed by previously dropped hangers, as shown in FIG. 14. Sweeper finger 262 is rotatably connected to a pin 263 as shown and to a pneumatic cylinder 264 at the rear end. Both pin 263 and pneumatic cylinder 264 are attached to a skin 266, which is an elongated band extending downward that surrounds collecting rail 260. Skirt 266 has a fiat top portion to which is attached finger 262 and cylinder 264. Skin 266 is connected to support 204 by a plurality of support rods 267 depending downward from support 204 and bolted or welded to the fiat top portion of skirt 266. Running underneath the fiat top portion is a pneumatic air line to power cylinders 264. The sweeping action of fingers 262 is coordinated with the movement of arm 220 so that finger 262 catches hanger 23 just after being received by the collecting rail 260. Each arm 220 has a sweeper finger 262 and is pneumatically driven.

The garments have now been sorted according to rout, account and individual and are all in proper order. Upon completion of the sortation process, garments 22 are ready for collection and removal to delivery vehicles or holding area. A collecting paddle assembly 270, shown in FIG. 10, comprises a paddle 272 connected to a horizontal arm 273, which in turn is connected to motor 274 mounted on base 276. Paddle assembly 270 is located underneath wheel 212 and collects and sweeps garments 22 on collecting rail 260 around toward the exit point. Garments 22 are swept toward the reverse curve portion 260A of collecting rail 260, which spirals downward and away from third sortation assembly 200. In this manner garments 22 will exit apparatus 5 by gravity.

In operation, computer 26 controls the various functions of apparatus 5 in accordance with a predetermined algorithm. Each sortation assembly 10, 100 and 200 is driven by the algorithm and the order in which garment identification means is read and inputted into computer 26. When a garment's unique identification number is registered into computer 26, the position relative to other garments 22 is determined. From the time of data entry the location of every garment 22 is tracked by computer 26. During the sortation processes the particular garment and its location are maintained in computer 26.

After the identification number is entered by scanning the identification means by bar code reader 24, or other means, garment 22 is placed onto conveyor 30, which transfers garments 22 to feeder mechanism 40, which is preferably oriented at a downward angle, from entry to exit. Pneumatically driven gate 47 controllably permits passage of several garments 22 at a time, in response to sensing device 50 located down line. Garments 22 that pass go through detangler 48, which rotates on axis in a direction that corresponds to the direction of the neck toward the end of the hook on hanger 23. Hangers 23 that may have crossed are thereby separated, ensuring proper processing.

Down line from detangler 48 hanger 23 then passes under sensing device 50. A second portion control unit, similar to controller 44, ensures passage of an appropriate number of garments 22. After passing under a second sensing device 50 hanger 23 passes between sprocket 52 and rail 42. The sprocket 52 controls passage of a single hanger 23 at a time toward the end of rail 42, which then drops onto carrier 62. It is important that only one hanger 23 at a time drop onto carrier 62. Carrier 62 then traverses rod 64 toward wheel 72. When carrier 62 and hanger 23 are positioned over wheel carrier 62 pincers 67 open, causing hanger 23 to drop onto V-notch 68 of wheel carrier 62, thus effecting the transfer of hanger 23 from feeder rail 42 to wheel assembly 70. The dual loading ability of the two carriers 62 increases the rate that hangers 23 can be loaded onto wheel assembly 70.

A critical feature of the present invention is the ability of wheel assembly 70 to selectively release hangers 23 on wheel carriers 62 at the correct receiving finger 84. This represents the first sortation, such as by route, and garments 22 are sorted by route number that is part of the identification number. Hangers 23 are loaded onto wheel assembly 70 one per wheel carrier 62. As each receiving finger 84, connected to slide rail 88, represents a different route, a garment 22 is loaded onto wheel 72 and rotates around counterclockwise (as viewed from above) until the correct route finger 84 is located. Each finger 84 represents a stop point in the wheel 70 rotation. As wheel 72 indexes, wheel carrier 62 opens and releases hanger 23 onto the correct finger 84, in accordance with a signal transmitted by computer 26. Gravity draws hanger 23 down slide rail 88 and onto accumulation conveyor 90. In this manner each garment 22 will be sorted and transferred within one rotation of the wheel 72. The compact nature of the sortation assembly provides an improved method of selectively separating garments 22.

After garments 22 have been sorted by first sortation assembly 10 each accumulation conveyor 90 has garments sorted by the first sonation criteria, such as by route. In order to move each collection of garments 22 to the next sortation, accumulation conveyors 90 convey its entire contents of garments 22 to transfer conveyor 92. Computer 26 directs the loading order of each conveyor 90. Once all garments 22 are on conveyor 92 they are transferred toward a second sortation assembly 100, if a second sortation assembly is used. Second sonation assembly 100 performs the same process as first sortation assembly 10, but with a different selection criteria, such as by account.

Garments sorted by account are transferred in a similar manner to the third sortation assembly 200. The third sort can be by an individual person's garment within an account. An important aspect of third sortation assembly 200 is the relationship between the wheel carriers 62 and arms 220. The groups of three make it so at each stop of wheel 212, the wheel can be loaded while any other of the "loaded" wheel carriers 62 ahead can unload, all ten at once or none or any number in between, depending on the order of garments 22 that are loaded. This makes every stop of wheel 212 a productive stop with no in between stops necessary. No garment 22 will ever have to back up or go a full turn of the wheel without arriving where it belongs on the correct arm 220. It should be appreciated that if arms 220 were not grouped in groups of three, there would be thirty distinct stop points instead of ten. This would mean that a garment 22 could not be loaded at every stop point unless there were forty or more arms, which would make the size of the wheel impracticably large and the separation necessary between the arms to permit freedom of movement too great to be useful.

An advantage of the present invention, then, is the ability of third sortation assembly 200 to selectively transfer garments 22 from wheel 212 to arm 220 in accordance with the selection criteria and computer algorithm, eliminating inefficient travelling of garments around and around a conveyor until the correct previous garment has been transferred to the collecting rails, as in Weiss. Furthermore, no reference marker or initial starting point for the wheel is needed, as computer 26 recognizes each garment in order as it is loaded onto the wheel. Additionally, there is no need for a bidirectionally moving conveyor to properly position the garments, as in Butcher et al., since predetermined stop points are programmed into the system. This provides a more accurate transfer from carrier to carrier.

In one aspect the efficiency of the present invention, and a point of distinction over the prior art, lies in the ability of the sortation assemblies to selectively and "intelligently" transfer garments to collecting assemblies. In the event a garment falls off or is removed from apparatus 5, an operator need merely go to computer 26 and enter the garment identification number. The computer will delete the information from the system without destroying the sequence or operation of the rest of the operation. Other garments are simply advanced in the computer algorithm with no gap appearing. The garment 22 can be rescanned at data entry area 20 and reprocessed.

Another advantage of the present invention is that once a batch of garments have been completely sorted by first sortation assembly 10 and moved off the collecting rails 90, a new batch of unsorted garments can be scanned and entered. This occurs while the second or third sortation assembly is operating, thus allowing for a continuous processing of garments. Other sortation apparatus requires that all garments be loaded and sorted by the entire apparatus before a new batch can be loaded.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. An apparatus for performing multiple sortation operations upon a number of garments, each garment having associated with it a unique identification means, comprising:
computer means for receiving data signals, processing data and transmitting control signals;
means for inputting identification data associated with a randomly ordered stack of said garments to said computer means, said computer means remembering the order in which items are input;
a first sortation assembly, comprising
a first rotating wheel assembly having a plurality of spaced apart fingers;
a plurality of carrier means each associated with one of said fingers, each of said carrier means being capable of receiving a garment and subsequently selectively releasing said garment in response to a signal from said computer means at one of a plurality of pre-determined points around an arc during said first wheel assembly rotation;

means for loading garments onto said carrier means said loading means responsive to a signal from said computer means;

a plurality of first receiving means each representing a different sortation group within a first sortation level for selectively accepting said garments from said first wheel assembly according to said identification data associated with said garment so that each said garment is sorted according to its corresponding identification data, the resulting assemblage defining a set of groups of first sorted garments;

a second sortation assembly, comprising a second rotating wheel assembly, said second wheel assembly having a plurality of spaced apart fingers;

a plurality of carrier means each associated with one of said fingers and each of said carrier means being capable of receiving an individual garment and subsequently releasing said garment at one of a plurality of pre-determined points around an arc during said second wheel assembly rotation in response to a signal from said computer means;

a plurality of collector arms associated with said second wheel assembly and an associated drive means for automatically bringing said each of said collector arms independently toward and away from said second wheel assembly for receiving a garment, each arm representing a different sortation group within a second sortation level for selectively accepting said garments from said second wheel assembly according to said identification data associated with said garment so that each said garment is sorted according to its corresponding identification data, the resulting assemblage defining a set of groups of second sorted garments; and a collecting means for accepting said garments from said collector arms; and a conveyor means for transferring said groups of first sorted garments to said second sortation apparatus.

2. The apparatus of claim 1, further comprising a feeder assembly for transferring garments to said wheel assembly after said identification data has been inputted into said computer means.

3. The apparatus of claim 2, wherein said feeder assembly comprises
a feeder rail;
a gate means responsive to a signal from said computer means for controlling passage of hangers;
at least one sensing means for determining the passage of garments along said feeder rail; and
a control means for permitting passage of individual garments at a determined rate to said first sortation wheel assembly.

4. The apparatus of claim 3, wherein said control means comprises a sprocket wheel driven by a motor whereby said sprocket wheel is positioned in proximity to said feeder rail and permits passage of one garment at a time between said sprockets.

5. The apparatus of claim 4, further comprising a detangling means for uncrossing crossed hangers.

6. The apparatus of claim 5, wherein said detangling means comprises a generally cylindrical elongated rigid barrel having a plurality of spaced elongated bristles fixedly attached to the barrel projecting radially from the surface of the barrel, the bristles being spaced substantially around the circumference of the barrel and a means associated with the barrel for rotating the barrel about the barrel axis, whereby rotation of said bristles through said hangers separates said crossed hangers.

7. The apparatus of claim 6, wherein said barrel is connected at both ends to said transfer rail and said rotating means comprises a motor connected to said barrel.

8. The apparatus of claim 1, wherein said first wheel assembly is operably connected to a drive means responsive to a signal from said computer means said drive means capable of indexing at determinable points during rotation.

9. The apparatus of claim 1, wherein said collecting means comprising a collecting rail.

10. The apparatus of claim 1, wherein said carrier means comprises a first and second jaws each pivotally movable from a closed position wherein projecting ends of said jaws are spaced together for defining a V-shaped notch for supportably receiving a garment hanger and spaced apart for releasing said garment hanger.

11. The apparatus of claim 1, wherein said identification data comprises a bar code label attached to said garment readable by a scanner means.

12. The apparatus of claim 11, wherein said scanner is in electronic communication with said computer means and transmits identification information to said computer means.

13. The apparatus of claim 1, wherein said first conveyor means comprises a conveyor belt capable of receiving and transporting a plurality of conventional wire garment hangers.

14. The apparatus of claim 1, wherein said loading means comprises
a first carrier means slidably engaged to a first rodless cylinder; and
a second carrier means slidably engaged to a second rodless cylinder, said second rodless cylinder being slidably mounted transversely to a third rodless cylinder,
said first and third cylinders being positioned parallel to each other, and said first and second carrier means reciprocally movable toward opposite ends of said cylinders, whereby one of said carrier means can accept a garment while the other said carrier means can release another said garment onto said wheel assembly carrier means.

15. The apparatus of claim 14, wherein said carrier means comprises a first and second jaws each pivotally movable from a closed position wherein projecting ends of said jaws are spaced together for defining a V-shaped notch for supportably receiving a garment hanger and spaced apart for releasing said garment hanger.

16. The apparatus of claim 1, wherein said first receiving means comprises an elongated finger portion suitable for receiving a garment hanger and a rigid rail portion for permitting transfer of garments by gravity, said finger portion being connected to said rail portion at an angle, said receiving means being in proximity to said first wheel assembly to selectively receive garments from said carrier means.

17. The apparatus of claim 1, further comprising a third sortation assembly positioned between said first and said second sortation assemblies, comprising:

a third rotating wheel assembly having a plurality of spaced apart fingers;

a plurality of carrier means each associated with one of said fingers, each of said carrier means being capable of receiving a garment and subsequently selectively releasing said garment in response to a signal from said computer means at one of a plurality of pre-determined points around an arc during said third wheel assembly rotation; and a plurality of third receiving means each representing a different sortation group within a third sortation level for selectively accepting said garments from said third wheel assembly according to said identification data associated with said garment so that each said garment is sorted according to its corresponding identification data, the resulting assemblage defining a set of groups of third sorted garments.

18. A method for performing multiple sortation operations upon a number of garments, each garment having associated with it a unique identification means comprising:

scanning said identification means to create electronically transmittable data;

entering said data into a computer means;

transferring said garments to a first wheel assembly, said wheel assembly having a plurality of spaced carrier means associated therewith, each carrier means capable of releasably supporting a garment hanger, said first wheel assembly being able to rotate such that each of said carrier means stops at a predetermined stop point;

selectively releasing each said garment at a predetermined stop point during rotation of said first wheel assembly in response to a signal from said computer means onto one of a plurality of receiving means, each receiving means corresponding to a distinct group within a first sortation level, said groups of garments defining a first sortation assemblage;

transferring said first sortation assemblage to a second sortation assembly;

loading said first sorted garments onto a second wheel assembly said second wheel assembly having a plurality of spaced carrier means associated therewith, each carrier means capable of releasably supporting a garment hanger, and a plurality of collector arms associated with said second wheel assembly and an associated drive means for automatically bringing said each of said collector arms independently toward and away from said second wheel assembly for receiving a garment, each arm having associated with it an arm carrier means, and each arm representing a different sortation group within a second sortation level for selectively accepting said garments from said second wheel assembly according to said identification data associated with said garment so that each said garment is sorted according to its corresponding identification data;

rotating said second wheel assembly such that each of said carrier means stops at a predetermined stop point;

moving at least one said collector arm carrier means toward said wheel carrier means at said stop point;

transferring said garment from said wheel carrier means to said collector arm carrier means in response to a signal from said computer indicating that said collector arm is the correct arm for said garment; and releasing said garment onto a collecting means whereby garments transferred by a given said collector arm are collected together in a sorted group, and whereby said groups define a second sortation assemblage.

19. The method of claim 18, wherein a plurality of said collecting arms are able to accept garments from a single carrier means.

20. The method of claim 18, further comprising a third sortation operation comprising transferring said first assemblage of garments one at a time to a third wheel assembly, said third wheel assembly having a plurality of spaced carrier means associated therewith, each carrier means capable of releasably supporting a garment hanger, said first wheel assembly being able to rotate such that each of said carrier means stops at a predetermined stop point;

rotating said third wheel assembly such that each of said carrier means stops at a predetermined stop point;

selectively releasing each said garment at a predetermined stop point during rotation of said first wheel assembly in response to a signal from said computer means onto one of a plurality of receiving means, each receiving means corresponding to a distinct group within a third sortation level, said groups of garments defining a third sortation assemblage; and transferring said groups of third sorted garments to said second sortation assembly, whereby said third sortation operation occurs after said first sortation operation and before said second sortation operation.

* * * * *